INVENTOR.
MYRON S. CURTIS
BY Kwis Hudson & Kent
ATTORNEYS

April 27, 1943.    M. S. CURTIS    2,317,522
MACHINE TOOL
Filed July 25, 1940    11 Sheets-Sheet 6

INVENTOR.
MYRON S. CURTIS
BY Kwis Hudson & Kent
ATTORNEYS

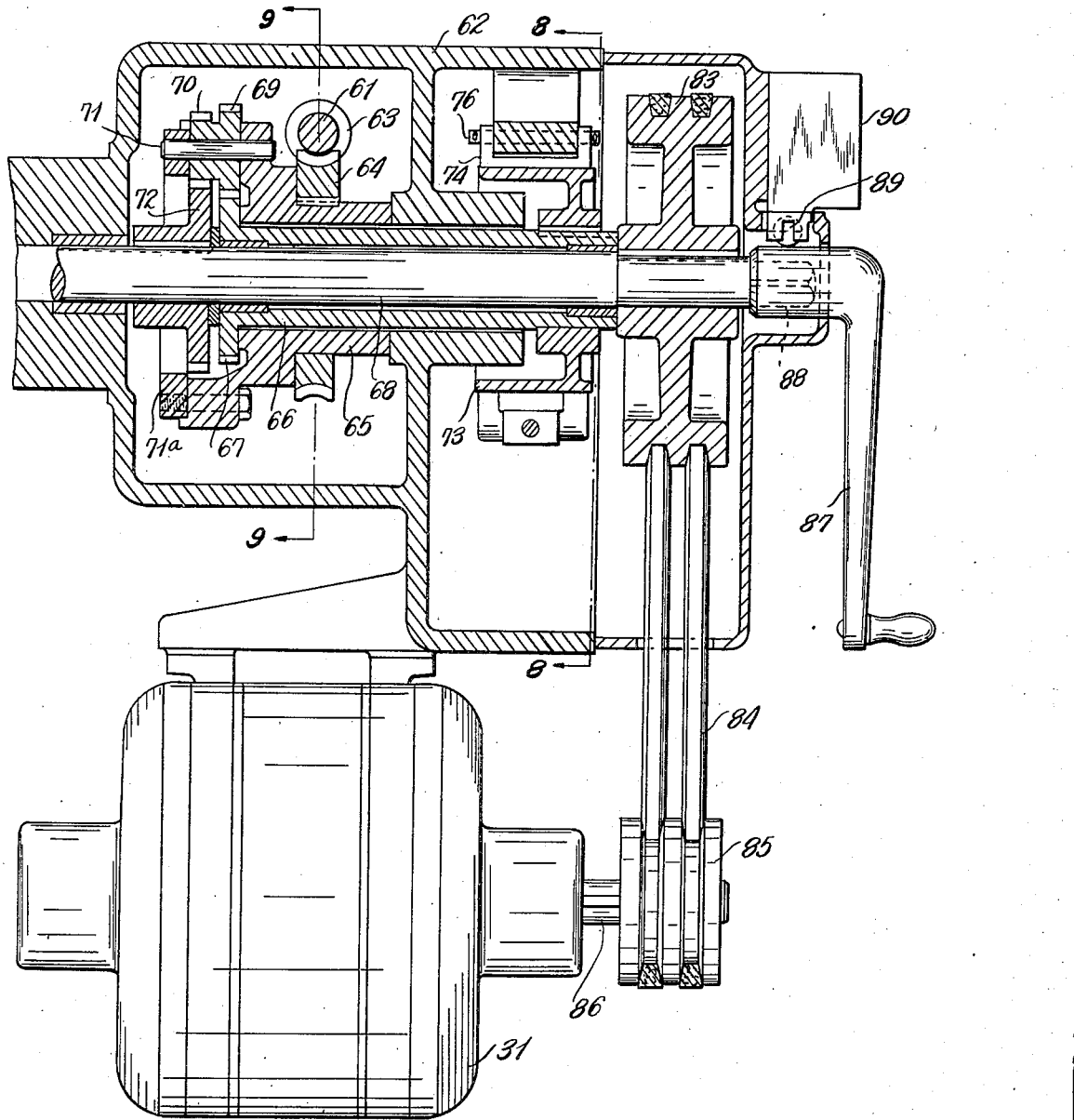

April 27, 1943.  M. S. CURTIS  2,317,522
MACHINE TOOL
Filed July 25, 1940  11 Sheets-Sheet 8
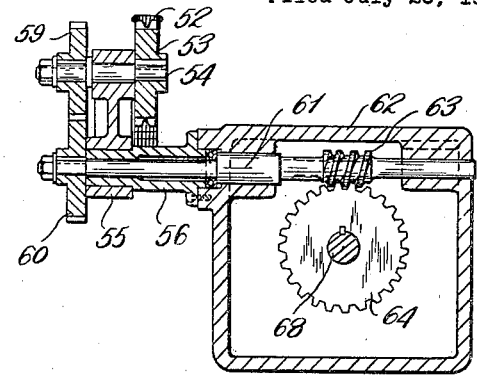
Fig. 9
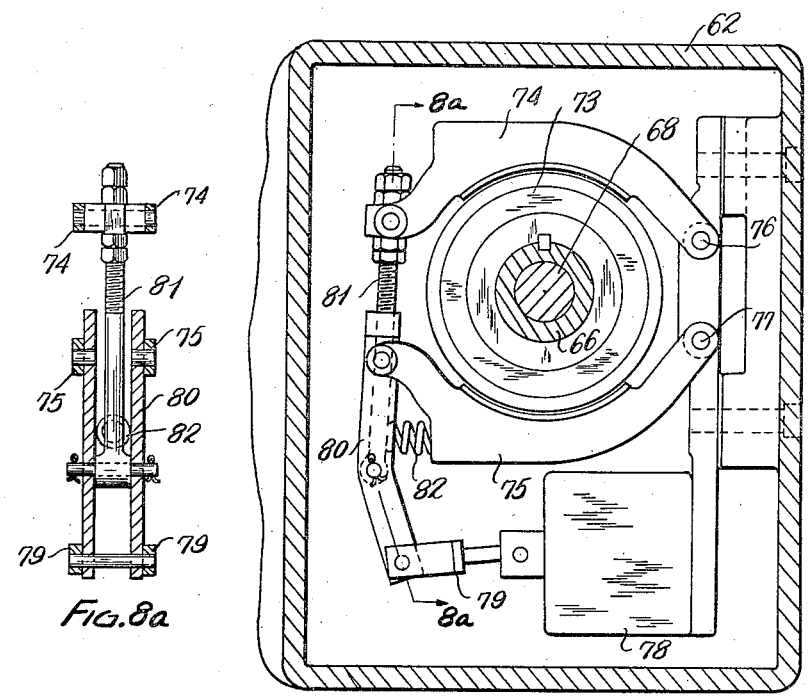
Fig. 8a
Fig. 8
INVENTOR.
MYRON S. CURTIS
BY
Kwis Hudson & Kent
ATTORNEYS April 27, 1943.  M. S. CURTIS  2,317,522
MACHINE TOOL
Filed July 25, 1940  11 Sheets-Sheet 9

INVENTOR.
MYRON S. CURTIS
BY Kwis Hudson & Kent
ATTORNEYS

April 27, 1943.  M. S. CURTIS  2,317,522
MACHINE TOOL
Filed July 25, 1940  11 Sheets-Sheet 10

INVENTOR.
MYRON S. CURTIS
BY Kwis Hudson & Kent
ATTORNEYS

Patented Apr. 27, 1943

2,317,522

UNITED STATES PATENT OFFICE 2,317,522

MACHINE TOOL

Myron S. Curtis, Pawtucket, R. I., assignor, by mesne assignments, to The Cleveland Trust Company, Cleveland, Ohio, a corporation of Ohio Application July 25, 1940, Serial No. 347,397

10 Claims. (Cl. 82—2)

This invention relates to a machine tool and particularly to a machine tool of the single spindle semi-automatic type wherein the work may be supported by and between the spindle and a tailstock or solely by the spindle without the support of a tailstock.

In order to illustrate certain embodiments of the invention there is shown in the drawings and described herein a machine tool particularly adapted for the manufacture of shell bodies, but it will be understood that the machine also possesses utility for manufacturing other articles which require turning, facing, boring, drilling, tapping and similar operations.

An object of the invention is to provide a machine tool capable of performing turning, facing, boring, drilling, tapping and similar operations on a workpiece, as, for example, a shell body, in a most efficient and efficacious manner and which machine possesses the requisite sturdiness and rigidity to machine the workpiece to the desired accuracy.

Another object is to provide a machine tool of the type specified and which is so designed that it may be quickly and efficiently adapted and tooled to perform either turning, facing, boring, drilling, tapping and similar operations on the workpiece as may be desired or necessary.

Another object is to provide a machine tool such as specified in the first mentioned object and wherein the tool holders are mounted, supported and moved in an efficient and simplified manner.

A still further and more specific object is to provide a machine tool such as has been referred to and wherein the tool holders are carried on bars that are supported at their opposite ends by upright portions of the machine, while the necessary feeding and idle movements are imparted to the tools carried by the bars by rocking or longitudinally moving said bars by mechanisms housed in said upright portions of the machine.

A still further object is to provide a machine tool of the type referred to which is mechanically operated but automatically controlled electrically by a control system which includes electrical interlocks to render certain parts of the machine inactive when other parts thereof are active.

Another object is to provide in connection with the control system referred to in the last named object means for effecting manually the relative idle or feeding movements between the work and tools and so associated with the control system that when said means is being manually operated no power actuated relative movements can occur between the work and the tools.

A further object is to provide in connection with the control system referred to means such that should any break occur in the control circuits the mechanisms that effect the relative movements between the tools and work are automatically stopped.

A still further object is to provide in a machine tool of the character specified means for facilitating the loading or unloading of the workpiece and which means is operatively associated with a tool holder to be functionally positioned thereby at predetermined times in the cycle of operation of the machine.

Further and additional objects and advantages not hereinbefore specified will become apparent hereinafter during the detailed description which is to follow.

Referring to the accompanying drawings,

Fig. 7 is a fragmentary sectional view taken substantially on line 7—7 of Fig. 1, looking in the direction of the arrows.

Fig. 8 is a sectional view taken substantially on line 8—8 of Fig. 7, looking in the direction of the arrows.

Fig. 8a is a detail sectional view taken on line 8a—8a of Fig. 8, looking in the direction of the arrows.

Fig. 9 is a sectional view taken substantially on line 9—9 of Fig. 7, looking in the direction of the arrows.

In order to clearly and simply describe the invention and the machine tool and the tool holders and tooling arrangements illustrated in the accompanying drawings the description will be divided into the following eight divisions or sub-titles, namely: General construction, spindle and spindle drive, Cam shaft drive, Tool holder operating cams, Tool holders and tooling arrangements, Lubrication, Control, and Operation.

The machine tool shown in Figs. 1 to 11 inclusive is adapted for performing turning and/or end facing operations on the workpiece, which is supported at its opposite ends by the work spindle and the tailstock.

Figure 12:
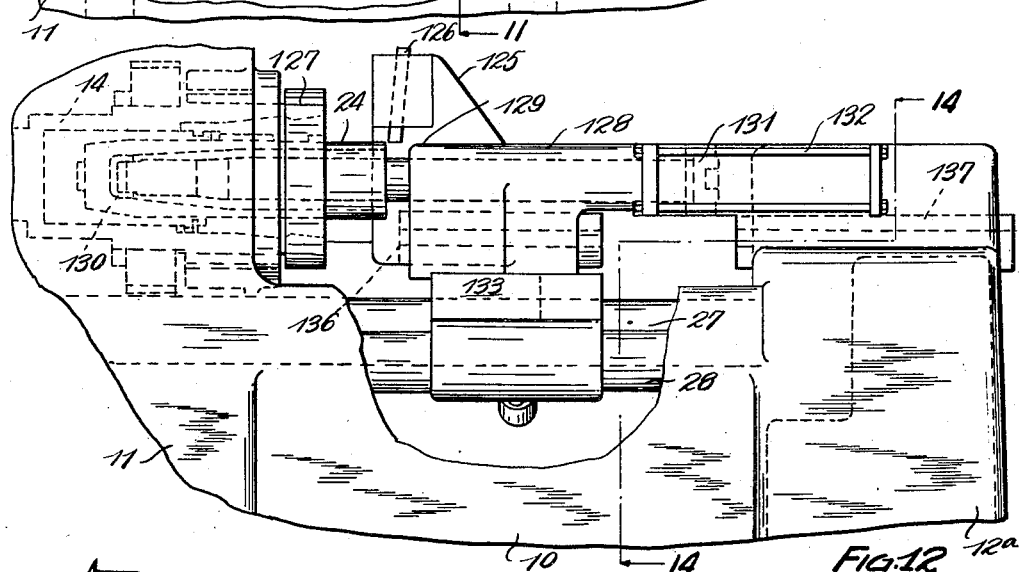
Fig. 12 (Sheet 9) is a partial front elevational view of a modified form of the machine wherein the work is supported solely by the spindle to allow boring operations to be performed at one end of the interior of the workpiece while end facing operations are performed on the opposite end of the workpiece.
Figure 14:
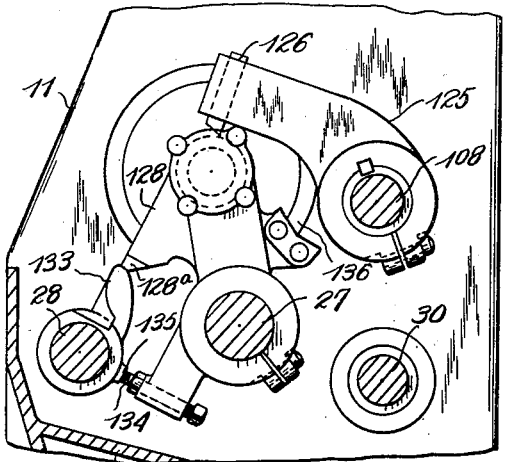
Fig. 14 (Sheet 10) is a sectional view taken substantially on irregular line 14—14 of Fig. 12 looking in the direction of the arrows.
Figure 13:
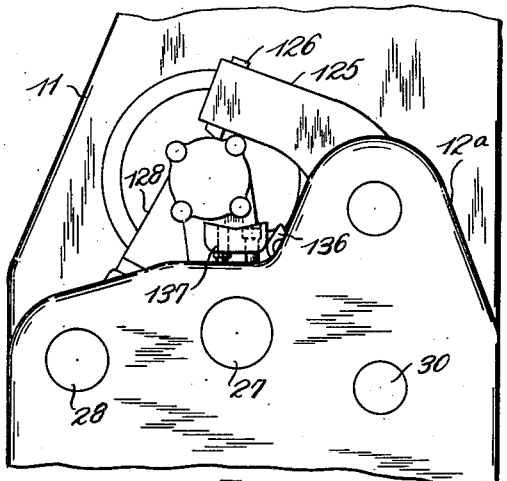
Fig. 13 (Sheet 10) is an end elevational view taken looking from the right-hand end of Fig. 12.

The machine tool illustrated in Figs. 12, 13 and 14 is modified over the machine tool shown in the previous views to the extent that the upright at the right-hand end of the base is different, to adapt the machine for the performance of boring operations on the interior of the end of the workpiece and for facing operations on the exterior of the opposite ends of the workpiece. Of course in performing such boring and end facing operations the workpiece is supported solely by the work spindle as the tailstock is omitted from the machine.

Figure 15:
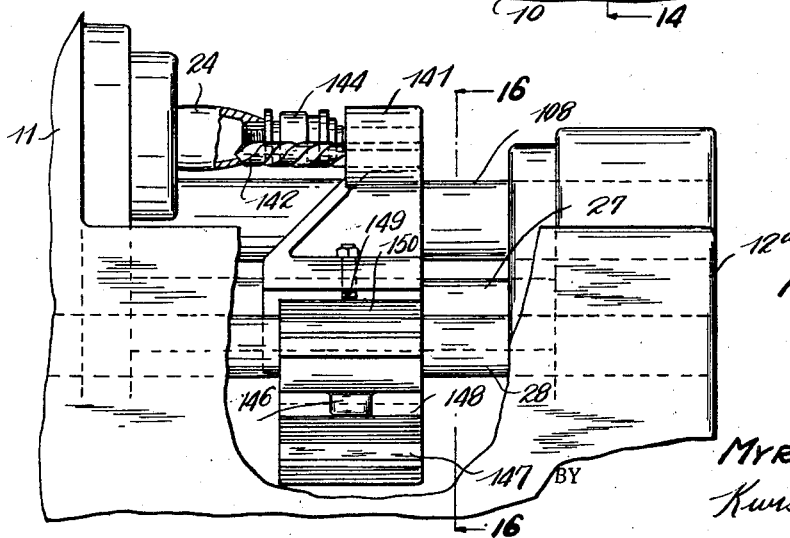
Fig. 15 (Sheet 9) is a partial front elevational view of the machine tool shown in Fig. 12 but illustrating a different tooling arrangement for the purpose of drilling and tapping the opposite end of the workpiece.
Figure 16:
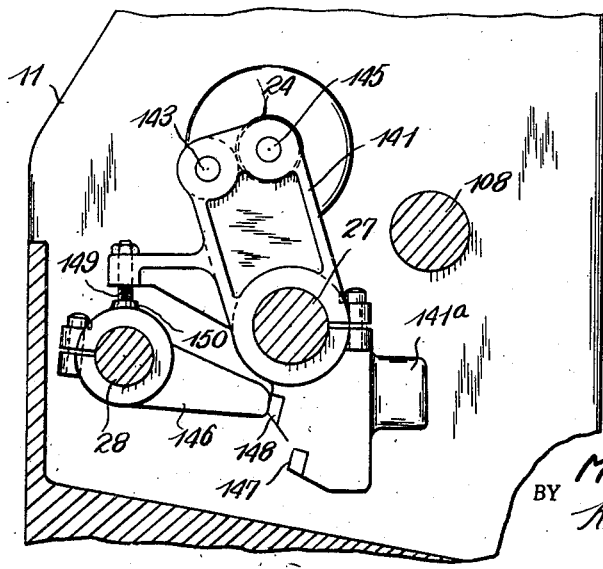
Fig. 16 (Sheet 10) is a sectional view taken substantially on line 16—16 of Fig. 15, looking in the direction of the arrows, and Fig. 17 (Sheet 11) is a wiring diagram of the electrical control system.

The machine tool shown in Figs. 15 and 16 is similar to that shown in Figs. 12 to 14 inclusive, and is adapted for performing drilling and tapping operations upon the interior of the workpiece at one end thereof. Likewise in this last form of the machine the workpiece is solely supported by the work spindle.

*General construction*

The machine tool of the single spindle semi-automatic type shown by way of example in the drawings and with particular reference to Fig. 1 comprises a base 10, which is provided at its opposite ends with an upright or headstock 11 and an upright 12 that may support a tailstock later to be referred to. The uprights 11 and 12 are connected by a bridge 13, best indicated in Fig. 4, suitably ribbed and of such shape as to form a pan for receiving the chips from the cutting tools and for depositing said chips toward the rear of the machine where they may be easily removed.

The upright or headstock 11 rotatably supports in suitable bearings a spindle 14 which in the present instance is a work spindle, while the upright 12 may support a tailstock 15 (see Figs. 1 and 3), but inasmuch as the construction and operation of the tailstock is conventional and well understood in the art and forms no part of the present invention it need not be further described herein.

The work spindle 14 is rotatably supported in suitable bearings (later to be referred to) arranged in the end walls of the upright or headstock 11. The spindle 14 is driven by means of a pulley 16, an electric motor 17 mounted on top of the upright or headstock 11, the motor pulley 18 and V-belts 19 (see Figs. 1, 2 and 5), with the pulley 16 operatively connected with the work spindle 14 in a manner later to be explained.

Figure 1:
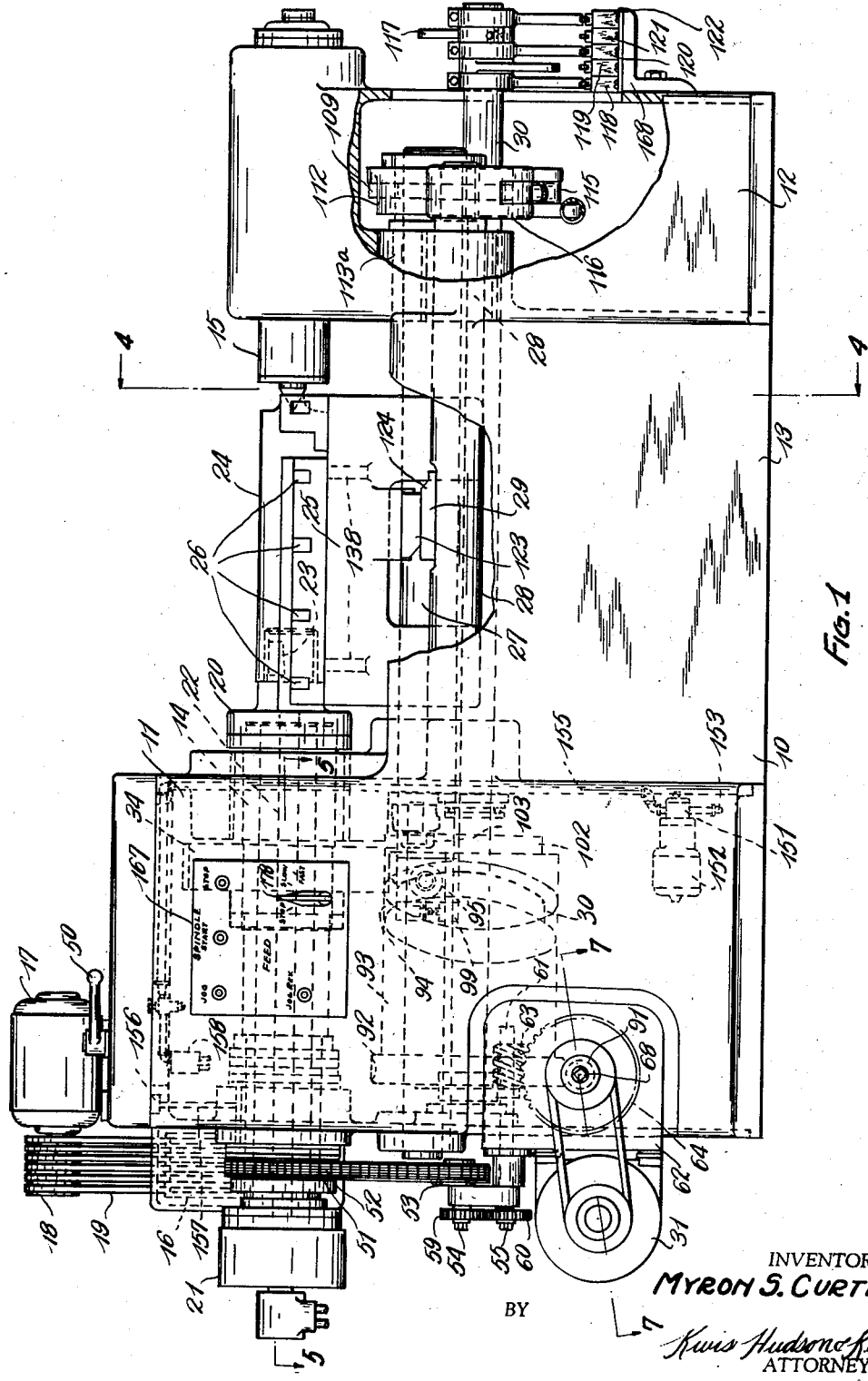
Fig. 1 is a front elevational view of a machine tool of the single spindle semi-automatic type and embodying the present invention, with certain parts broken away to clearly show other parts lying behind the same and also with certain parts indicated by dotted lines; the machine being shown as tooled for the performance of turning operations on the workpiece.

As clearly shown in Fig. 1, the work spindle 14 is provided on one end with an expanding arbor 20 which may be of conventional type, while secured to the opposite end of the work spindle is a cylinder 21 in which a piston (not shown) may be moved by fluid pressure in a manner well known in the art. The piston is connected by an operating rod 22 with the shoes 23 of the expanding arbor 20 to effect work engagement and release. The workpiece 24 shown in Fig. 1 may have the expanding arbor 20 inserted in one of its ends, while the other end of the workpiece may be supported by the tailstock 15 if turning and end facing operations are to be performed on the workpiece. The workpiece 24 is positively driven by the work spindle through the medium of the shoes 23 of the expanding arbor.

Figure 4:
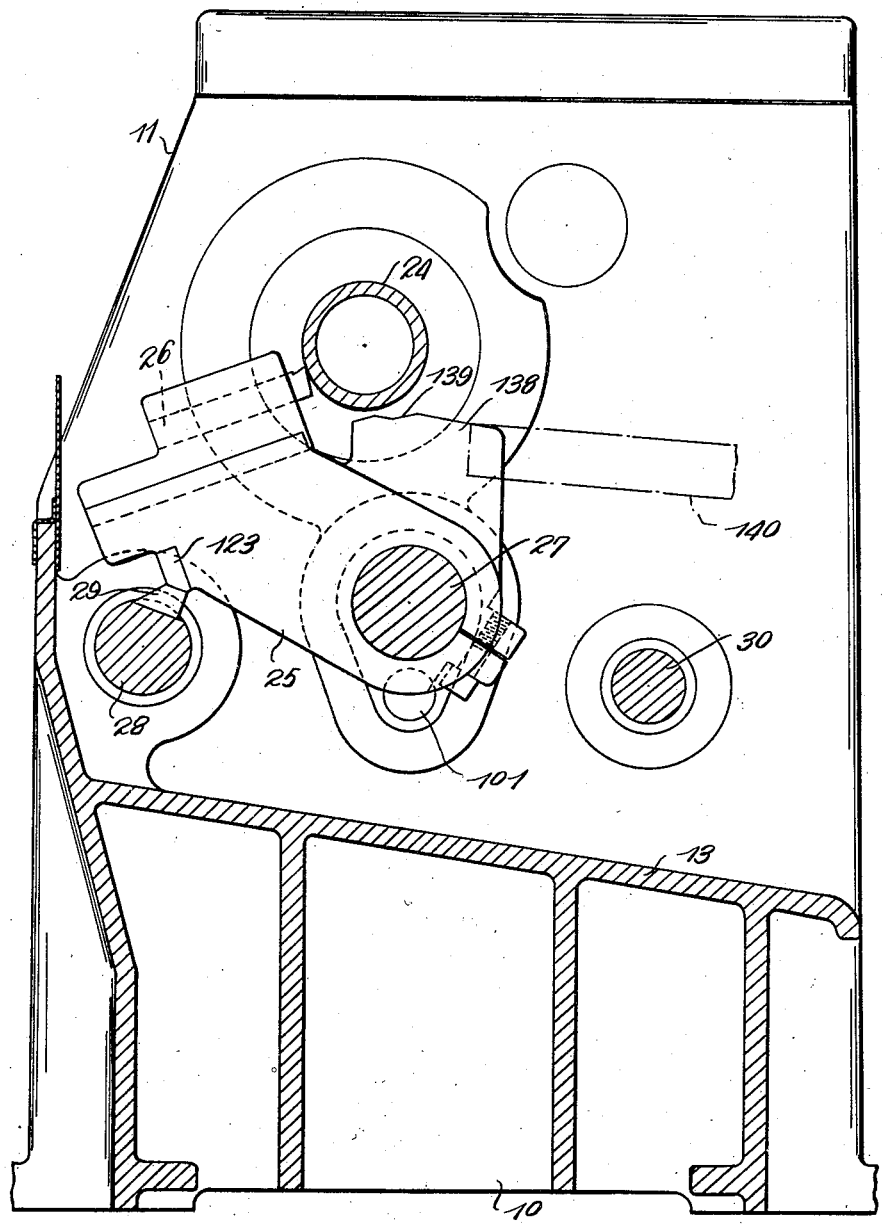
Fig. 4 is a transverse vertical sectional view through the machine tool, taken substantially on line 4—4 of Fig. 1 looking in the direction of the arrows, it being noted that the tool holder shaft at the rear of the machine is omitted as the machine is tooled for turning operations only.

A tool holder 25 is securely clamped to a bar 27 and may carry one or more turning tools 26, there being four such tools shown by way of illustration, see Figs. 1 and 4. The bar 27 is parallel with the work spindle 14 and is supported in bushings in the uprights 11 and 12 and is free to slide or reciprocate axially and also to rock or oscillate in said bushings. A second bar 28 parallel to the bar 27 and fixed against longitudinal or axial movement is also supported in the uprights 11 and 12 in such manner that it can be rocked or oscillated synchronously with the imparting of longitudinal movement to the bar 27 as will be hereinafter described. The bar 28 has fixed to it a cam 29 which cooperates or coacts with the tool holder 25 for the purpose of oscillating or rocking the latter as will be hereinafter explained.

Figure 6:
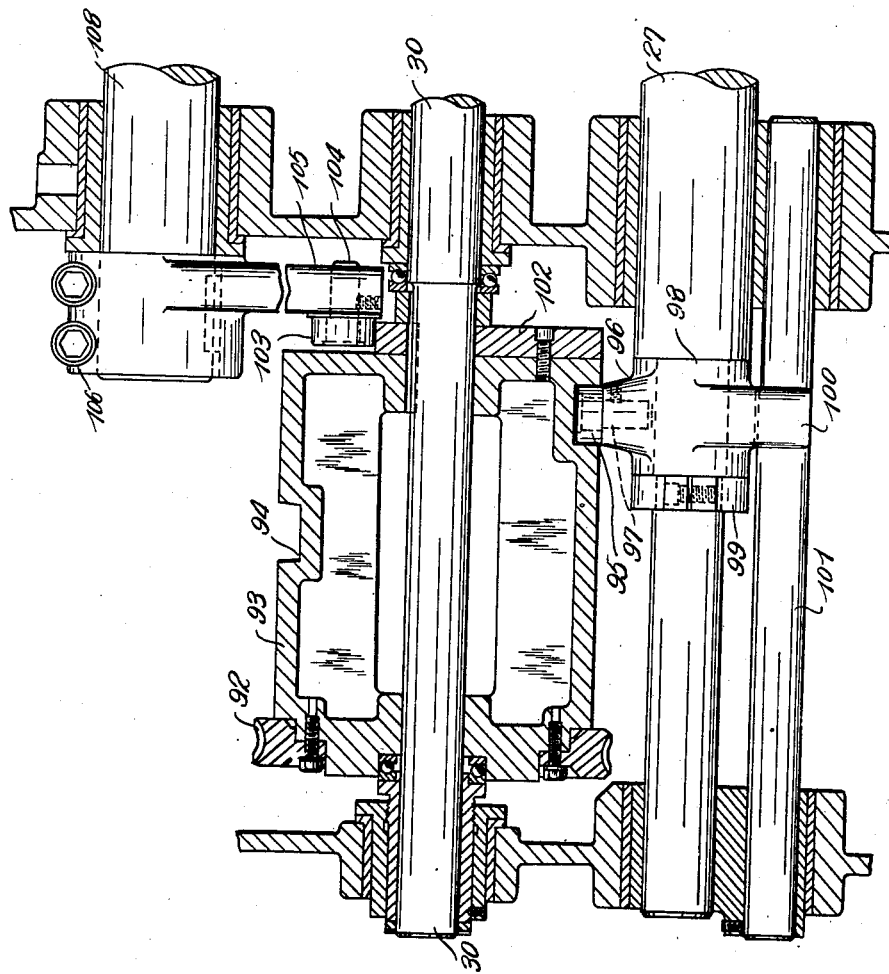
Fig. 6 is a fragmentary sectional view taken substantially on irregular line 6—6 of Fig. 2, looking in the direction of the arrows, with the left-hand end portion of the tool holder shaft at the rear of the machine being illustrated.

The bars 27 and 28 are operated by cams fastened to a rotatable cam shaft 30 which extends the entire length of the machine and is supported in suitable bearings formed in the uprights 11 and 12 (see Figs. 1 and 6). The cam shaft 30 can be driven from the work spindle 14 and synchronously therewith when feeding or cutting movements are being imparted to the tool holder or holders and the tools carried thereby, or said cam shaft can be driven independently of the work spindle and at a high constant speed by an electric motor 31 to impart idle movements to the tool holder or holders. The cam shaft 30 can be disconnected from either the spindle 14 or the motor 31 or it can be disconnected from both the spindle and motor at the same time. However, as will later be pointed out, the cam shaft 30 cannot be simultaneously driven both from the spindle 14 and from the motor 31.

Spindle and spindle drive

Figure 5:
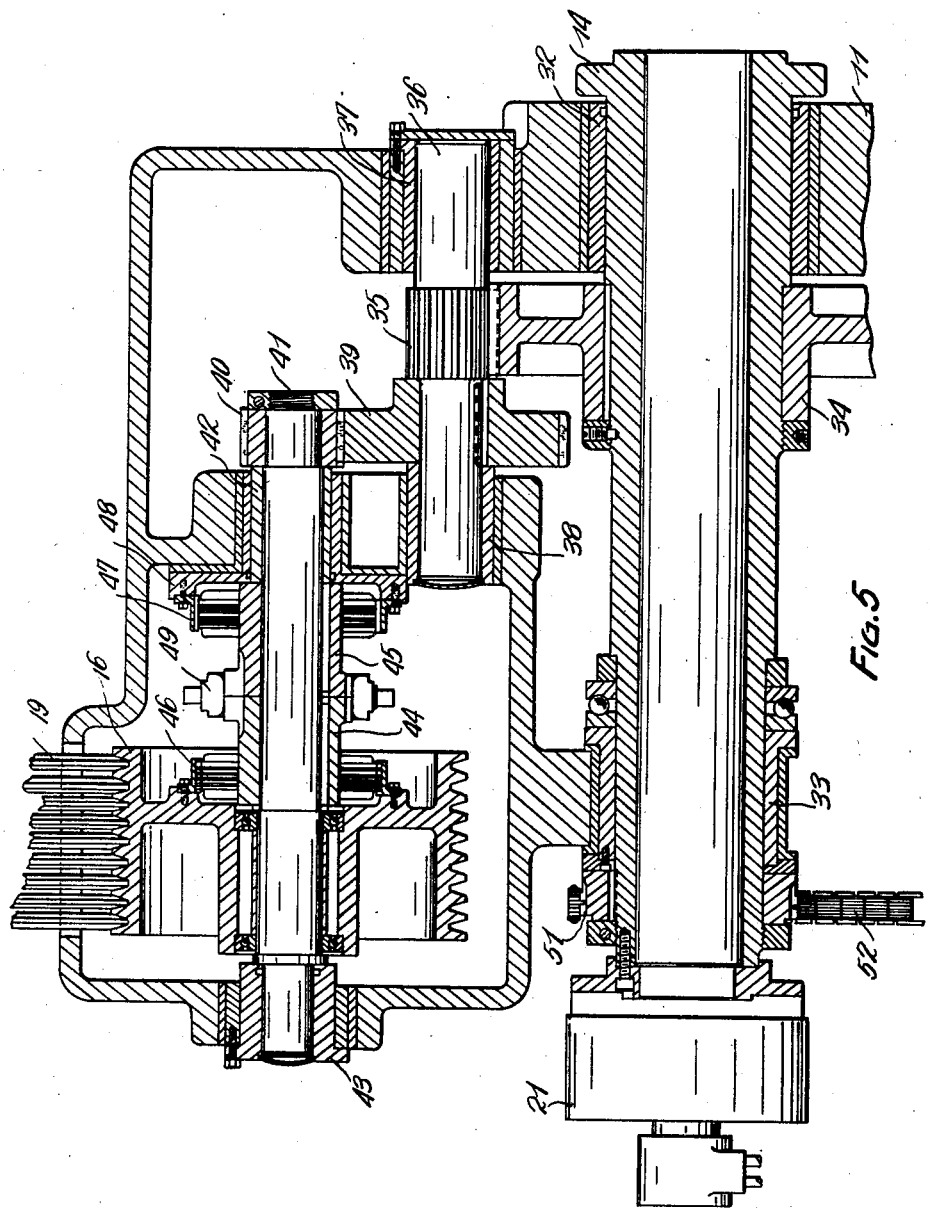
Fig. 5 is a sectional view taken substantially on irregular line 5—5 of Fig. 2, looking in the direction of the arrows.

As previously stated the work spindle 14 is rotatably mounted in suitable bearings supported in the end walls of the headstock 11 and said bearings are clearly shown in Fig. 5 and are indicated by the numerals 32 and 33. The work spindle 14 has keyed to it a gear 34 which constantly meshes with a pinion 35, in this instance formed integral with a countershaft 36 that is rotatably mounted in suitable bearings 37 and 38 also carried by the headstock or upright 11. A gear 39 is keyed to the counter-shaft 36 and constantly meshes with a pinion 40 fixed to the right-hand end, as viewed in Fig. 5, of a shaft 41 that is rotatably mounted in suitable bearings 42 and 43 also arranged and supported in the headstock or upright 11.

The shaft 41 has splined to it one element or member 44 of a clutch and one member 45 of a brake. The pulley 16 is arranged concentrically with the shaft 41 and is freely rotatable relative thereto on suitable anti-friction bearings carried by said shaft. The pulley 16 has secured to it the other element or member 46 of the clutch to operatively coact with the clutch element or member 44 that is splined to the shaft 41. Attached to an internal wall of the headstock or upright 11 is a bushing 48 to which is secured the other member 47 of the brake for cooperation with the brake member 45 that is splined to the shaft 41. A yoke 49 may be moved by means of a hand lever 50, see Figs. 1 and 2, to the right or left longitudinally of the shaft 41 to effect shifting of the clutch member 44 and brake member 45. When the yoke is shifted to the right the clutch members 44 and 46 are disengaged, thus freeing the pulley 16 for rotation independently of the shaft 41, while at the same time the brake members 45 and 47 are engaged to stop rotation of the shaft 41 and the work spindle 14 which is connected to said shaft by the gearing previously described. The movement of the yoke 49 and the clutch member 44 and brake member 45 to the left disengages the brake members 45 and 47 and engages the clutch members 44 and 46, at which time the pulley 16 is operatively connected to and drives the shaft 41 and the work spindle 14 through the gearing 40, 39, 35 and 34.

Cam shaft drive

The work spindle 14 extends outwardly of the left-hand end wall of the upright or headstock 11 as viewed in the drawings, and has keyed thereto a sprocket 51 that drives through a chain 52 another sprocket 53 keyed and fixed to a short shaft 54, see Figs. 1, 2, 5 and 9. The shaft 54 is rotatably mounted in one arm of a carrier or yoke 55 and which carrier or yoke 55, in turn, is swingably mounted on a bushing 56 that is fixedly secured to the outer side of a wall of a gear box 62 later to be referred to. The carrier or yoke 55 can be angularly adjusted on the bushing 56 and then clamped in adjusted position and held from oscillation by means of a clamping bolt 57 carried by the gear box and extending through an elongated arcuate slot 58 formed in another arm of the carrier or yoke. It will be understood that the carrier or yoke 55 can be adjusted to tighten or loosen the chain 52 by first loosening the nut on the bolt 57, properly swinging the yoke or carrier and then tightening the nut on the bolt to clamp the carrier or yoke in adjusted position.

The shaft 54 on the outer side of the carrier or yoke 55 has removably keyed to it a pick-off gear 59 which meshes with and drives a pick-off gear 60 that is removably keyed to the outer end of a shaft 61. The shaft 61 extends through the bushing 56 and is rotatably mounted in suitable bearings formed in a gear box 62 that is carried by the upright or head stock 11, see Figs. 1, 2, 7 and 9.

The shaft 61 intermediate its supporting bearings has integrally formed thereon within the gear box 62 a worm 63 which meshes with and drives a worm gear 64 keyed to the sleeve portion of a pinion carrier 65, see Fig. 7. The sleeve portion of the pinion carrier 65 although held against axial movement is freely rotatable on the hub 66 of a different gear 67 that, in turn, is freely rotatable on the feed shaft 68 but maintained against longitudinal movement relative thereto.

The pinion carrier 65 fixedly mounts a stud 71 on which is rotatably arranged differential pinions 69 and 70 that are formed integral with each other and are held in position by a retaining ring 71a secured to the pinion carrier. The pinion 69 meshes with the differential gear 67, while the pinion 70 meshes with the differential gear 72 that is keyed to the feed shaft 68, as clearly shown in Fig. 7.

By reference to Figs. 7, 8, and 8a it will be seen that a brake drum 73 is keyed to the right-hand end of the hub 66 of the differential gear 67 and that adjacent to the brake drum are brake shoes 74 and 75 which are pivotally mounted on pins 76 and 77 fixedly carried by the gear box 62. The brake shoes 74 and 75 are operatively connected with a solenoid 78 by means of a link 79 which is pivotally connected to the lower ends of the double lever 80 of a toggle arrangement and to the core of the solenoid. The levers 80 are connected to the brake shoe 75 and intermediate their ends to the rod 81 of the toggle and which rod is connected to the brake shoe 74.

When the solenoid is energized the brake shoes, through their toggle connection with the core of the solenoid, as just described, are brought into engagement with the brake drum to resist the rotation of the drum and the hub 66 and differential gear 67. When the current to the solenoid 78 is cut off and the latter is deenergized a spring 82 acting on the toggle through the rod 81 effects the opening of the brake shoes 74 and 75 to release their braking effect on the drum 73 and allow said drum and the hub 66 of differential gear 67 to rotate freely.

The feed shaft 68 is extended to the right, as viewed in Fig. 7, beyond the brake drum 73 and has keyed to it a pulley 83 which is operatively connected through belts 84 and pulley 85 with the shaft 86 of the motor 31.

It will be seen from the foregoing that if the motor 31 is not operating and the solenoid 78 is deenergized and the brake shoes 74 and 75 have been opened by the spring 82, no braking action will be effected by said brake shoes on the brake drum 73. If at this time the work spindle 14 is rotating and the differential pinion carrier 65 is being driven by the worm gear 64, the differential gear 67 being freely rotatable will merely be revolved idly by the pinion 69, while the pinion 70 because of the inertia of the feed shaft 68 will impart no movement to the differential gear 72 and said feed shaft 68 but will roll idly around the circumference of the gear 72.

However, assuming that the motor 31 remains inactive but the solenoid 78 is energized, then the brake shoes 74 and 75 will close on the brake drum 73 and their braking action thereon will hold the hub 66 and its differential gear 67 stationary and said differential gear 67 will constitute a reaction point for the pinion 69, so that the rotation of the carrier 65 by the worm gear 64 will cause the pinion 70 to rotate the differential gear 72 and, in turn, the feed shaft 68 to which it is keyed. When the feed shaft 68 is thus rotated the pulley 83 keyed thereto will act through the belts 84 and pulley 85 to idly rotate the armature or motor shaft 86 of the motor 31 which, it will be remembered, is not energized or active at this time.

It will be seen that under the conditions just enumerated the feed shaft 68 will be driven by the work spindle 14 through the operative connection between the feed shaft and said work spindle previously set forth herein including the differential gearing and that the rotation of the feed shaft 68 will be synchronized with the rotation of the work spindle 14.

Now assuming that the solenoid 78 is deenergized to release the brake shoes 74 and 75 and the motor 31 is energized or rendered active, it will be apparent that the feed shaft 68 will be directly driven by the motor 31 through the pulleys 83 and 85 and the belts 84. Upon the release of the brake shoe the differential gear 67 will be free to be rotated, while the direct rotation of the differential gear 72 by the feed shaft 68 will act, through the pinions 70 and 69, to freely rotate said differential gear 67. Under the conditions just set forth the feed shaft 68 will be driven at a high constant speed by the motor 31 and independently of the work spindle 14 since the rotation of the pinion carrier 65 will now be an idle movement. The manner in which the energizing and deenergizing of the solenoid 78 and the rendering of the motor 31 active or inactive is obtained, as referred to above, will be hereinafter described in detail.

Reference to Fig. 7 will show that the feed shaft 68 may be rotated by hand by the crank handle 87 that can be positioned to coact with the squared extended end 88 of the feed shaft 68. As the crank handle 87 is positioned on the squared end 88 of the shaft 68 it engages a roller 89 and moves said roller in a manner such as to open a switch 90 mounted on the gear box 62 to prevent energization of either the motor 31 or the solenoid 78 as will later be made apparent in connection with the description of the control and operation.

Figure 2:
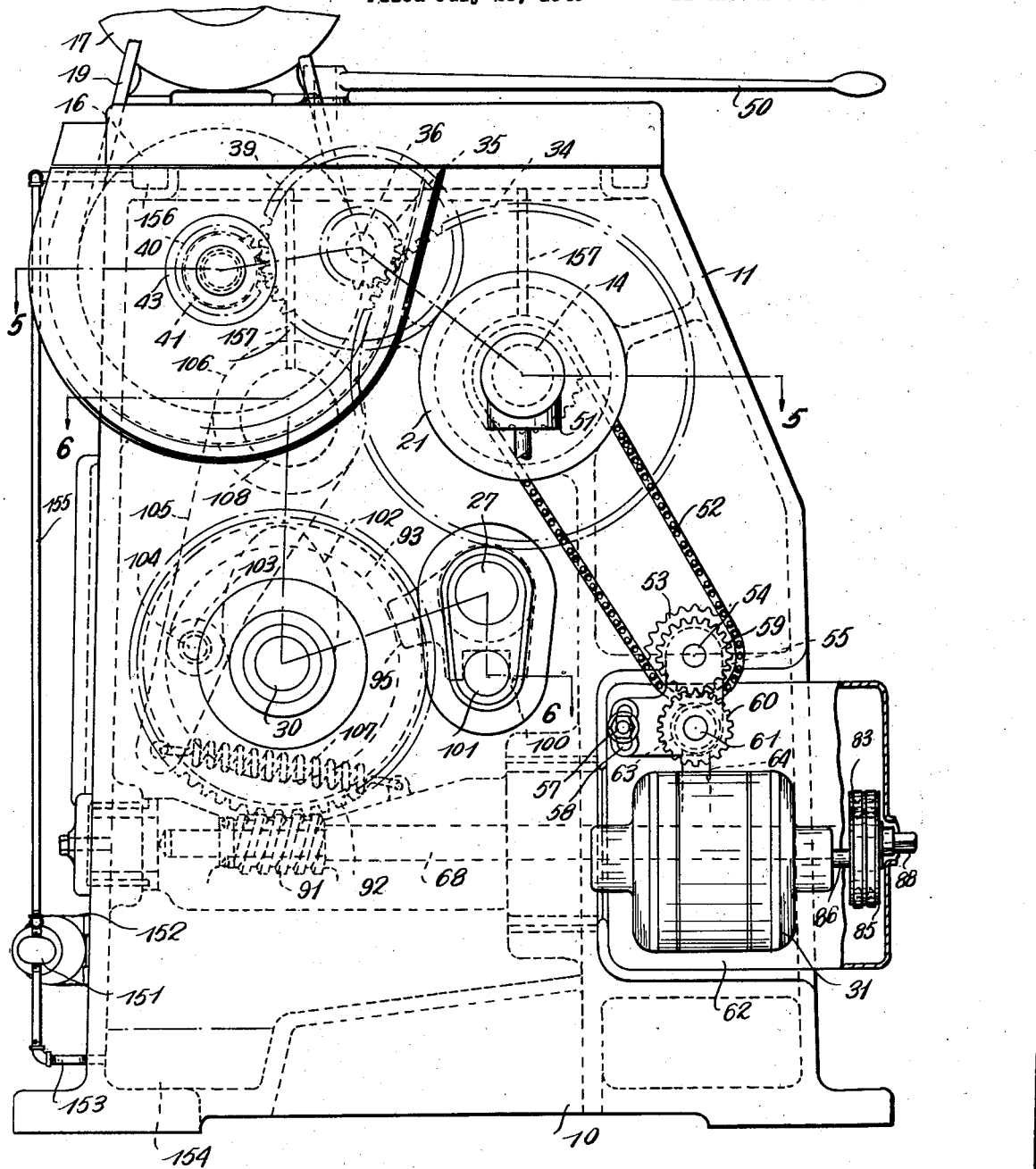
Fig. 2 is an end elevational view of the machine tool shown in Fig. 1 taken from the left-hand end of Fig. 1 and is on a larger scale than is said Fig. 1.

As previously stated, the feed shaft 68 is rotatably supported in the gear box 62 and said shaft extends toward the rear of the machine within the upright or headstock 11 and has keyed to it adjacent its rear end a worm 91, see Figs. 1 and 2, which meshes with and drives a worm gear 92 that is fixedly secured by bolts or other suitable means to one end of a cylindrical cam drum 93 (see Fig. 6). The cam drum 93 is keyed in driving relationship to the cam shaft 30, wherefore, in view of the foregoing description, it will be seen that the cam shaft 30 can be driven either from and synchronously with the work spindle 14 or it can be driven by the motor 31 at a high constant speed independently of the work spindle, or said cam shaft may remain stationary even though the work spindle is rotating.

Tool holder operating cams

The cam drum 93 (see Fig. 6) has its periphery formed with a continuous cam groove or path 94 of suitable form or lead in accordance with the character of the tools and the movements to be imparted thereto, and this cam groove or path receives a cam roller 95 that is rotatably mounted on a stud 97 fixedly supported in a cam roller carrier 96. The cam roller carrier 96 has a sleeve portion which rotatably receives the tool holder bar 27, but said bar 27 is held against axial or longitudinal movement in the sleeve portion of the cam roller carrier 96 by the shoulder 98 formed on the tool holder bar 27 and by a collar 99 that is clamped to said bar, as clearly shown in Fig. 6.

It will be seen that the rotation of the cam drum 93 and cam shaft 30 by the shaft 68 through the worm 91 and worm gear 92 will cause the cam groove 94 to impart linear movement to the roller 95 and the carrier 96 and tool holder bar 27 in a direction axially of said bar 27.

It will also be seen that notwithstanding the rotation of the cam drum 93 the tool holder bar 27 can oscillate or rock in the carrier 96 independently of the latter, since the sleeve portion of the carrier 96 rotatably receives the bar 27 and is provided with downwardly extending fingers 100 which slidably straddle a fixed rod 101 and serve to hold said carrier against any rocking or oscillating movement.

The cam drum 93 at its end opposite to that to which the worm gear 92 is secured has fixed to it to rotate therewith a face cam 102 that coacts with a cam roller 103 rotatably mounted on a stud 104 that is fixed in the arm 105 of a lever 106, see Figs. 2 and 6. The cam roller 103 is held constantly in contact with the face cam 102 by means of a spring 107 fastened at one of its ends to the free extremity of the arm 105 and at its other end to a fixed lug carried by the gear box 62. The lever 106 has a sleeve portion that may be clamped and keyed to one end of a tool holder bar or shaft 108 so as to rock or oscillate with said bar or shaft. It will later be explained that the tool holder bar 108 may be omitted if end facing operations are not being performed on the workpiece.

The tool holder bar or shaft 108 is parallel to the work spindle 14 and the bars 27 and 28 and extends between and is supported in suitable bearings arranged in the uprights 11 and 12.

Figure 3:
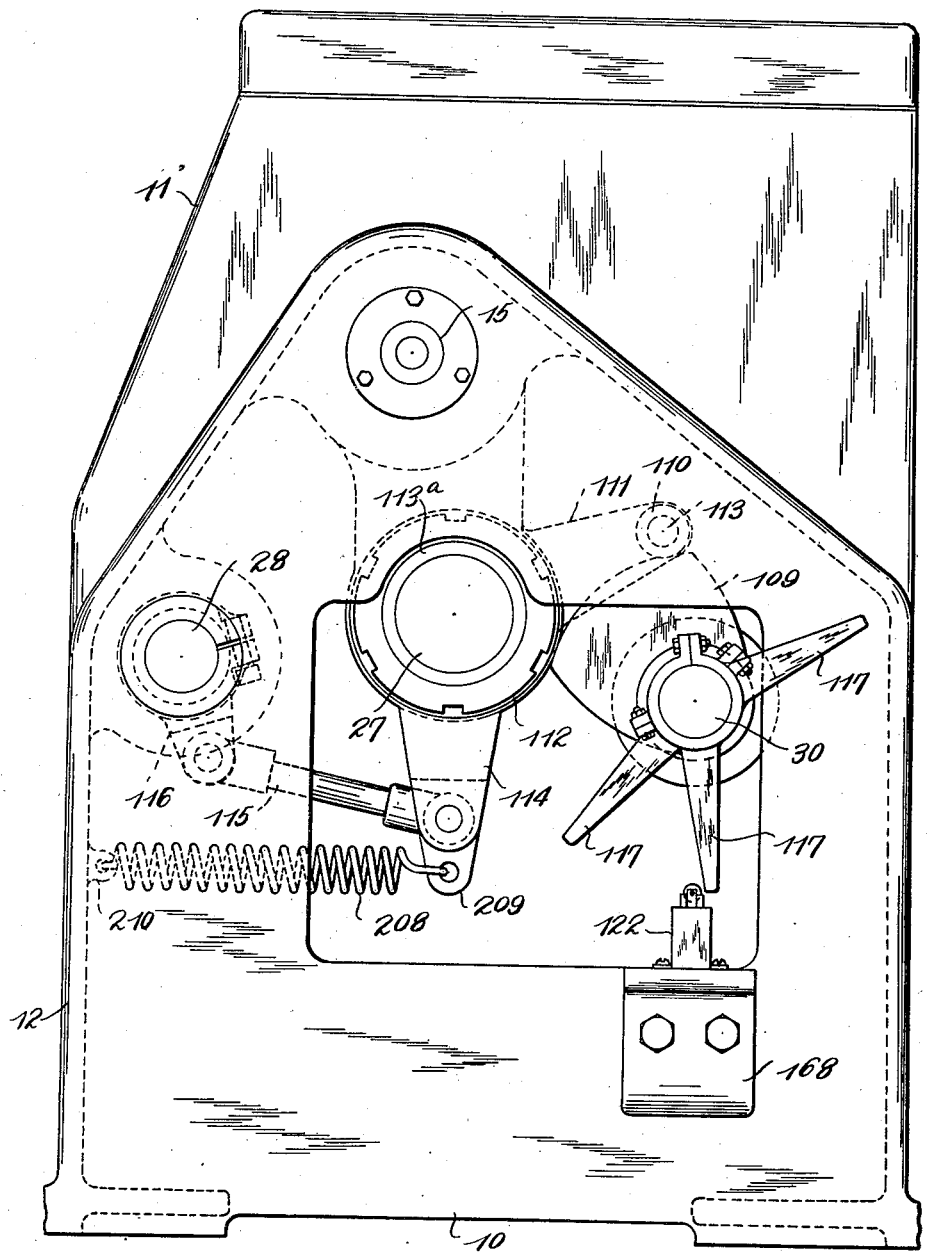
Fig. 3 is an end elevational view taken from the right-hand end of Fig. 1 and is on a larger scale than is said Fig. 1.

The cam shaft 30 extends the full length of the machine, as previously pointed out, and has a cam 109 keyed to it within the upright 12, see Figs. 1 and 3. A cam roller 110 cooperates with the cam 109 and is rotatably mounted on a stud 113 fixedly carried by the free end of an arm 111 of a link 112. The link 112 has a sleeve portion which is freely rotatable on the bushing 113a fixedly supported by the upright 12 and through which bushing slides the tool holder bar 27. The link 112 is provided with a second and downwardly extending arm 114 that is pivotally connected to one end of a connecting rod 115, the opposite end of which is pivotally connected to a lever arm 116 securely clamped or fastened to the bar 28, wherefore it will be seen that rotation of the cam shaft 30 operates through the cam 109, link 112, rod 115 and lever arm 116 positively to rock or oscillate the bar 28 in an anti-clockwise direction.

In order that the cam roller 110 will be held firmly against the cam 109 and to cause oscillation or rocking movement of the bar 28 in a clockwise direction when it is permitted to do so by the position of the cam 109, a coil spring 208 has one of its ends fastened to an extension 209 of the arm 114, while its other end is connected to a fixed lug 210 located internally of the upright 12.

The cam shaft 30 extends outwardly of the right hand end wall of the upright 12, as viewed in Fig. 1, and a plurality of switch operating fingers 117 are securely clamped or fastened to this extended end of the cam shaft 30 but in such manner that the relative positions of said fingers on the cam shaft 30 can be adjusted. The rotation of the cam shaft 30 causes the fingers 117 to operate in predetermined sequence upon the switches 118, 119, 120, 121 and 122 that are mounted on a panel 168 secured to the outer side of the right-hand end wall of the machine.

The operation of the switches 118, 119, 120, 121 and 122 by the fingers 117 controls certain of the automatic functions of the machine, as will later be more fully explained. It should be noted that the fingers 117 are so located as to be readily accessible for the adjustment of said fingers on the cam shaft 30 to suit various conditions of operation as they may arise.

Recalling the foregoing description it should be remembered that the cam shaft 30 may be driven either from and synchronous with the work spindle 14 or it may be driven at a high constant speed by the motor 31.

It will also be recalled that the operation of the cam shaft 30 effects, through the medium of the cams hereinbefore referred to, the operative movements of the tool holder bars 27 and 28 as well as the operative movements of the tool carrier shaft 108, and further that the fingers 117 and the switches with which they cooperate control certain of the automatic operations of the machine.

*Tool holders and tooling arrangements*

As previously described, the tool holder bar 27 and the tool carrier shaft 108 carry the tool holders, and the various types or forms which such tool holders may take will now be described.

In Figs. 1 and 4 there is shown one form of tool holder 25 which is firmly but removably fixed or clamped to the tool holder bar 27 intermediate the uprights 11 and 12 and above the bridge 13. The tool holder 25 moves longitudinally with the bar 27 when the latter is axially moved through the medium of the rotating cam 93 and the cam track or groove 94 formed in the periphery thereof and said tool holder also rocks or oscillates with said bar when the latter is rocked or oscillated.

The tool holder 25 is shown in Fig. 1 in its position at the finish of its longitudinal or cutting movement toward the work spindle 14, while Fig. 4 clearly shows the position of the tool holder 25 at this time with the turning tools 26 carried thereby in cutting contact with the workpiece 24.

The tool holder 25 is provided with an elongated hardened shoe 123 that contacts with the elongated cam 29 carried by the bar 28, wherefore the bar 28 constitutes a thrust resisting member or support against the pressure or thrust of the cutting tools 26 when taking cuts on the workpiece 24. If the bar 28, upon the completion of the turning or cutting operation is oscillated or rocked in a clockwise direction, as viewed in Fig. 4, the hardened shoe 123 carried by the tool holder 25 may follow the contour of the cam 29 and allow said tool holder to oscillate or rock by gravity in a counterclockwise direction to free or relieve the tools 26 from the workpiece 24, whereupon when the tool holder 25 is moved longitudinally by the cam 93 toward the tailstock 15 the tools 26 will not score or mark the workpiece 24 during such return idle movement.

The finished workpiece can be removed from between the work spindle 14 and the tailstock 15 and a new workpiece inserted therebetween when the tool holder 25 is in its extreme right-hand position, as viewed in the drawing. Then, after a predetermined longitudinal idle movement of the holder 25, the cutting tools 26 can be brought into cutting contact with the new workpiece 24 upon the proper oscillation or rocking movement of the bar 28 in a counterclockwise direction as will be clearly understood.

It will be noted by reference to Fig. 1 that the cam 29 on the bar 28 is provided adjacent its right-hand end with an inclined face 124 and since the bar 28 is held against longitudinal movement it results that longitudinal movement of the tool holder 25 with the bar 27 from its extreme right-hand position and towards the work spindle 14 will cause the shoe 123 on the holder 25 to ride on the face 124 of the cam 29. This results in a gradual clockwise oscillation or rocking of the tool holder 25 and a gradual or tapered feeding movement of the cutting tools carried by the tool holder 25 into the work piece.

It will also be seen that if the bar 28 is rocked or oscillated further in a counterclockwise direction the cutting tools 26 will be fed into the workpiece in a direction transversely of the axis thereof due to the engagement between the cam 29 and shoe 123. Consequently by selectively combining the longitudinal movement of the bar 27 and tool holder 25, the oscillation or rocking movements of the bar 28 and the shape of the cam 29, the cutting tools 26 can be caused to have various desired directions and amplitudes of feeding or cutting movements or combinations of such movements so that the cutting or turning operations of the tools upon the workpiece will properly bring the latter to the desired shape. In the tooling arrangement shown in Figs. 1 and 4 the tool holder shaft 108 may be omitted from the machine, if desired.

Figure 10:
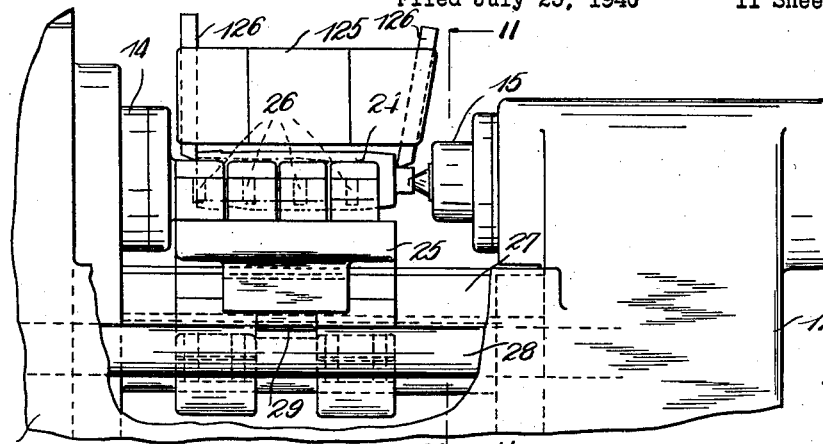
Fig. 10 (Sheet 9) is a partial front elevational view of a different tooling arrangement than that shown in Figs. 1 to 9 inclusive, as end facing tools are illustrated in addition to turning tools.
Figure 11:
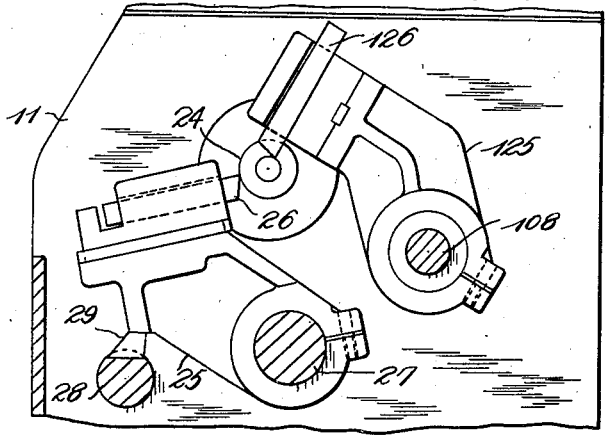
Fig. 11 (Sheet 10) is a sectional view taken substantially on line 11—11 of Fig. 10, looking in the direction of the arrows, it being noted that the tool holder shaft at the rear of the machine is shown as carrying the end facing tools.

As previously stated, the tool holder shaft 108, see Fig. 6, may be employed and have a tool holder secured thereto and such an arrangement is illustrated in Fig. 10 (Sheet 9) and Fig. 11 (Sheet 10) to provide for the end facing of the workpiece, it being understood, however, that the functions of the tool holder 25, tool holder bar 27 and bar 28 as well as cam 29 are the same as hereinbefore described.

A tool holder 125 is fixedly secured to the tool holder shaft 108 to rock therewith and is shown as provided with a pair of end facing tools 126. It will be understood that when the cam 102 on the cam shaft 30 (see Fig. 6) rocks or oscillates the shaft 108 through the arm 105 of the lever 106 the tool holder 125 will be similarly rocked or oscillated and the tools 126 carried thereby will be brought into cutting contact with the ends of the workpiece 24 and fed across such ends transversely of the axis of the workpiece in a predetermined and desired manner.

Another form of tooling which may be applied to the machine for the purpose of operating upon the inside of the workpiece and within the contemplation of the present invention is shown in Fig. 12 (Sheet 9) and Figs. 13 and 14 (Sheet 10) of the drawings. In this tooling arrangement it is contemplated that the tailstock 15 will not be employed and that a somewhat differently shaped upright 12a will be used since the workpiece will be gripped or chucked at one end only and within the work spindle 14 by means of a spring-jawed collet 127 in a manner well understood in the art, as distinguished from being supported at its opposite ends by the spindle and tailstock.

A tool holder 128 is firmly clamped to the tool holder bar 27 to move longitudinally or rock therewith and such tool holder supports a boring bar 129 carrying a boring cutter 130. The boring bar 129 is fixed against rotation in the tool holder 128 but can be moved longitudinally relatively to the tool holder by means of a piston 131 operatively connected with the boring bar 129 and slidable in a cylinder 132 under the action of pressure fluid obtained from a suitable source of supply as will be well understood. The cylinder 132 is secured to the tool holder 128 and moved therewith.

The bar 28 is provided with a cam 133 fixed thereto and arranged to cooperate with a hardened shoe 128a carried by the tool holder 128, wherefore oscillation or rocking movement of the bar 28 in a counterclockwise direction causes said cam 133 to move or rock the tool holder 128 clockwise from an inactive position into the active position shown in Fig. 14 and wherein the boring bar 129 is coaxial with the work spindle 14 and the workpiece 24 and can be moved endwise into the latter. When the tool holder 128 is in this position the shoe 128a contacts the high point of the cam 133 and a stop screw 134 carried by an extension of the tool holder abuts against a flattened surface 135 of the cam 133, with the result that the tool holder 128 is firmly held in the operative position. It will be understood that the cam 133 and the surface 135 thereof are elongated so that the tool holder 128 will be properly maintained in this operative position, notwithstanding any longitudinal movement it may have with the tool holder bar 27.

When the bar 28 is rocked or oscillated in a clockwise direction the shoe 128a moves off the high point of the cam 133 and the screw 134 out of engagement with the surface 135 of the cam, whereupon the tool holder 128 may oscillate or rock by gravity in a counterclockwise direction from its active to its inactive position provided the boring bar 129 has been suitably retracted from the work piece. When the boring bar 129 has been removed from the work piece and the tool holder 128 has been rocked to its inactive position the workpiece may be slipped out of or unloaded from the collet chuck 127 in the work spindle.

It will be understood that any movement of bars 27 and 28 will be synchronized, so that the oscillation or rocking of the tool holder 128 in either clockwise or counterclockwise direction will take place only when the boring bar 129 is retracted and the tool holder 128 is at the extreme right-hand position as viewed in Fig. 12, so that said boring bar 129 is free of and clears the workpiece. It will be understood that the cylinder 132 and piston 131 are only for the purpose of imparting idle movements to the boring bar 129 and that all feeding movements imparted thereto will be derived from a suitably designed cam 93 on the cam shaft 30.

The oscillation or rocking of the tool holder 128 can be employed for another useful purpose which will become apparent. Assuming that an end facing operation is also being performed on the workpiece and the tool holder or arm 125 provided with an end facing tool 126 for this purpose is secured to the shaft 108, it will be seen that it would be extremely difficult to load or unload the workpiece 24 in or from the machine if the workpiece is very heavy. Consequently a tray 136 may be secured to the tool holder 128 to move therewith and to be positioned by the counterclockwise oscillation or rocking of the tool holder into the latter inactive position in a location substantially beneath that occupied by the workpiece and in line with a trough 137 that is fixedly carried by the upright 12. When the tray 136 and the trough 137 are in alignment and the tray 136 substantially beneath the workpiece, the latter can be unloaded from the spindle into the tray 136 and trough 137 and then moved to a conveyor or other suitable member located at the right-hand end of the machine. Similarly in loading a new workpiece into the machine the tray 136 and trough 137 may initially receive the workpiece and facilitate its insertion into the jaws of the chuck.

The tool holder 25 shown in Fig. 1 can be provided, if desired, with means to facilitate the loading and unloading of the workpiece.

Referring to Figs. 1 and 4, it will be seen that the tool holder 25 is provided with longitudinally spaced ribs 138 in which is formed a trough 139. Consequently oscillation or rocking of the tool holder 125 in a counterclockwise direction locates the trough 139 beneath the position occupied by the workpiece 24 and then when the tailstock 15 is withdrawn from the workpiece the latter may be eased onto the trough 139 and can then be rolled over the ribs 138 and onto bars 140 from whence it can be moved to a conveyor or a similar member at the rear of the machine. It may be remembered that in the tooling arrangement shown in Figs. 1 and 4 the shaft 108 may be omitted.

In Fig. 15 (Sheet 9) and Fig. 16 (Sheet 10) there is shown another tooling arrangement for operating on the interior of the workpiece and one wherein the bar 28 performs an additional function. The tool holder 141 is rigidly clamped to the bar 27 to rock and move longitudinally therewith. The tool holder 141 carries a plurality of tools of different types, in this instance, a drill 142 fixedly mounted in a tool socket 143 in the tool holder and a tap 144 fixedly located in a tool socket 145 in the tool holder, it being understoood that the particular type and number of tools can be varied.

When the bar 28 is rocked a predetermined amount in a counterclockwise direction the cam 146 fixed to the bar 28 operates on the tool holder 141 and rocks the latter in a counterclockwise direction from an inactive position to the right of the workpiece to a position wherein the drill 142 is placed in line with the workpiece for operation thereon. At this time the cam 146 abuts against the shoe 147 on the tool holder 141 and is maintained in engagement therewith by the action of a counterweight 141a on the tool holder 141. If a further rocking movement is imparted to the bar 28 in a counterclockwise direction the cam 146 causes the tool holder 141 to also rock further in a counterclockwise direction against the action of the counterweight 141a until the tap 144 is in line with the workpiece, at which time the cam 146 abuts the shoe 148, while the stop screw 149 carried by the tool holder 141 engages the surface 150 on the cam 146 as clearly shown in Fig. 16. The surface 150 and the cam 146 are elongated longitudinally of the machine, as indicated in Fig. 15, in order to provide for the longitudinal movement of the tool holder 141.

It will be understood that the movements of the tool holder bar 27 and the bar 28 will be synchronized, to the end that the oscillation or rocking movement of the tool holder 141 takes place only when the die 142 or the tap 144 are clear of the workpiece, and inasmuch as both bars 27 and 28 both are controlled by the cam shaft 30, such synchronization can very readily be provided.

When the bar 28 is rocked or oscillated in a clockwise direction the tool holder 141 can then rock in a clockwise direction under the action of the counterweight 141a and until both the tools 142 and 144 are displaced from in front of the workpiece 24 and are in their original inactive position, whereupon the latter may be slid endwise out of the spindle chuck for unloading and a new workpiece loaded in the chuck. It will be understood that the counterweight 141a causes the lower extension of the tool holder 141 to closely follow the cam 146 in its movements.

*Lubrication*

The required lubrication of the machine is provided by a pump 151, secured to the rear side of the upright or headstock 11, see Figs. 1 and 2. The pump 151 is driven by an individual motor 152 and has its suction or inlet pipe 153 connected with a sump 154 in the base 10 of the machine, while its delivery or outlet pipe 155 is connected with a trough or channel 156 in the top of the upright or headstock 11.

A plurality of oil conduits 157 are in communication with the trough or channel 156 and extend to the various bearings of the machine so that the lubricating oil can flow by gravity from the trough or channel 156 to said various bearings. When the lubricating oil has passed over the various bearings it flows by gravity through suitable conduits (not shown) into the sump 154 in the base of the machine and from which it is recirculated again by the pump 151 back to the trough or channel 156.

A pressure operated switch 158 (see Figs. 1 and 17) is operatively associated with the delivery or outlet pipe 155 of the lubricant circulating system such that the pressure of the lubricant flowing through the pipe 155 acts to close this switch and permit operation of the machine. On the other hand, when no lubricant is flowing through pipe 155 or when the pressure of the flowing lubricant reaches a predetermined minimum the switch 158 automatically opens, whereupon the operation of the machine immediately stops, as will later be pointed out.

*Control*

Figure 17:
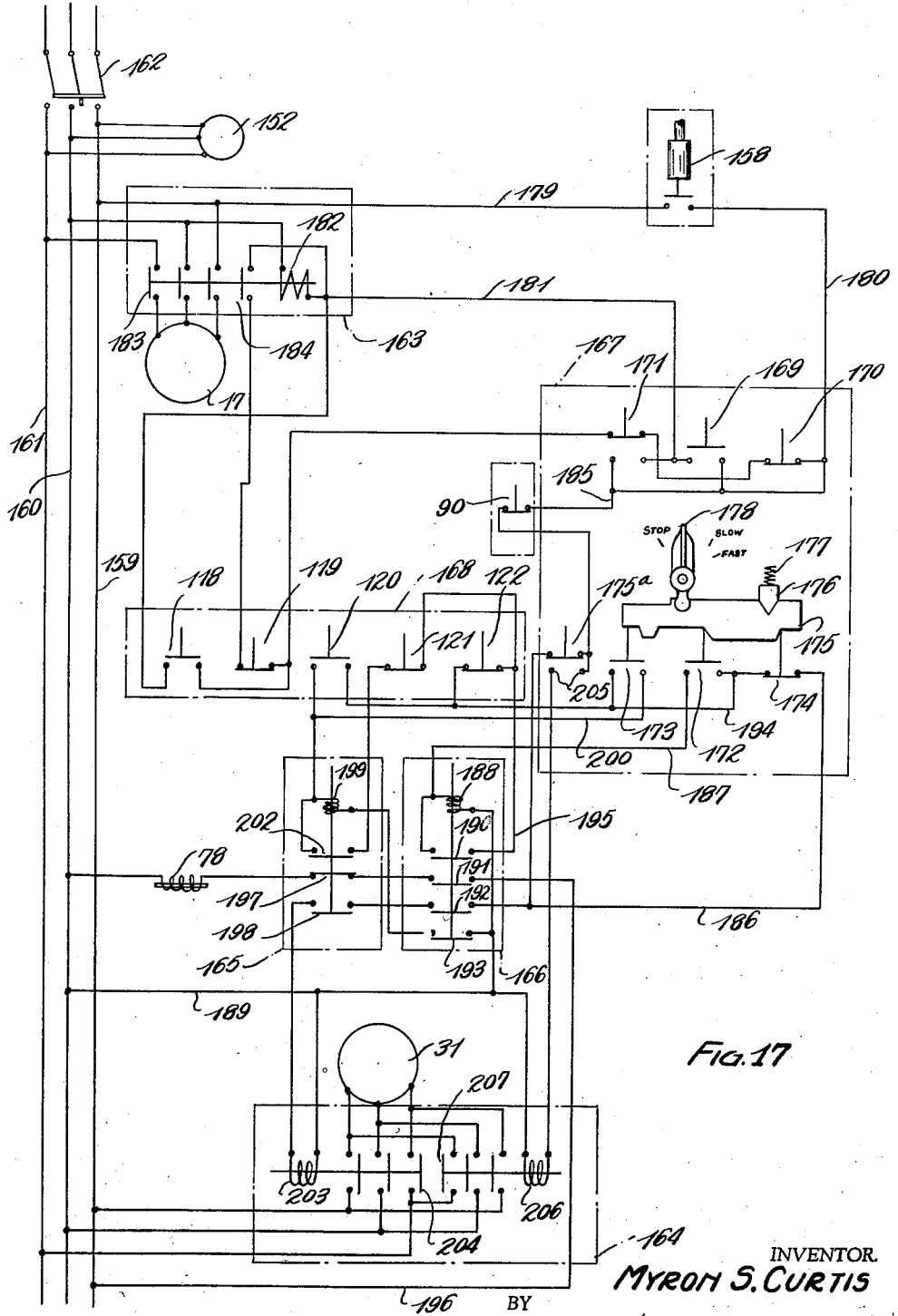

As previously explained the machine is controlled both automatically and manually and the means for doing this is shown in Figs. 1 and 17, with the latter figure disclosing diagrammatically the electrical control system employed and which system includes overload relief switches for the motor starter, temperature controls, etc., as will be well understood in the art.

Referring particularly to Fig. 17, it will be seen that the electrical current employed in the control system is derived from a three-wire source of supply and comprises the main line wires 159, 160 and 161. A hand operated main switch 162 that may be conveniently located serves to connect or disconnect all current with or from the machine. The pump motor 152 is directly connected to the main line wires with no intervening switch, wherefore as soon as the hand switch 162 is closed the pump motor 152 will be energized and will run continuously until the switch 162 is opened.

The motor 17 that drives the spindle 14 is connected with the main line wires through a starter switch 163, while the feed motor 31 is connected to the main line wires through a reversing starter switch 164. The control circuits for the motors 17 and 31 include the relays 165 and 166. The single phase brake solenoid 78 is connected with the main line wires through the relays 165 and 166.

In a convenient position on the front of the upright or headstock 11 of the machine is a manual control panel 167, while at the right-hand end of the machine is an automatic control panel 168 located so that its switches may be operated by the fingers 117 that are connected to and operated by the cam shaft 30 (see Fig. 1).

The switch 158 which is controlled by the pressure of the lubricating oil, as previously referred to, is located in the conduit 179 which supplies all the switches with current, wherefore it will be evident that when the switch 158 is opened the motors 17 and 31, as well as the brake solenoid 78 will be idle, as no current can flow to any of the solenoids of the switches, relays or contactors in the system.

A safety switch 90 is located in the control line 185 for the motor 31 and the brake solenoid 78 and the purpose of this switch is to prevent the shaft 68 from being operated by power, either synchronously with the spindle 14 or at relatively high constant speed by the motor 31 during any time when the operator is turning the shaft 68 by the hand crank 87. The safety switch 90 is normally closed and the operation of the motor 31 and the solenoid 78 therefor is normally permitted. However, when the crank handle 87, as shown in Fig. 7, is placed in position to coact with the squared end 88 of the shaft 68 such crank handle will by means of the roller 89 open the switch 90 and cut off all current to the motor 31 and the brake solenoid 78.

The spindle operating motor 17 is controlled by means of the set of controls carried by the hand control panel 167 and which controls include a starting switch 169, a stop switch 170 and a jog switch 171. The motor 17 is further controlled by the start switch 118 and the stop switch 119 mounted on the automatic control panel 168, see Figs. 1 and 17. Likewise, the hand control panel 167 is provided with a starting switch 172 for the brake solenoid 78, a starting switch 173 for the feed motor 31, a stop switch 174 for both the motor 31 and the brake solenoid 78 and a jog reverse switch 175 for reversing the operation of the feed motor 31. Similarly the automatic control panel 168 is provided with a switch 121 for energizing the brake solenoid 78, a switch 120 for starting the feed motor 31, and a switch 122 for stopping or deenergizing both the motor 31 and the brake solenoid 78.

It is to be understood that the oil pressure switch 158, the safety switch 90, the hand control switches 169, 170, 171, 172, 173, 174 and 175 and the automatic control switches 118, 119, 120, 121 and 122 are all of the momentary contact type and remain in the operative position only so long as forceably held therein against the spring action that tends to return them to their inoperative positions.

The feed can be hand-controlled through the medium of switches 172, 173 and 174 that are operated by a cam 175 normally held in a neutral position by means of the plunger 176 and a spring 177 acting on said plunger. When the hand lever 178 is moved from its neutral or central position, the cam 175 is moved by the lever from its neutral position and effects operation of the switches 172, 173 or 174 as the case may be. When the operator releases the hand lever 178 the plunger 176, under the action of the spring 177, is effective to move the cam 175 and the hand lever 178 back to neutral position.

The relays 165 and 166, previously referred to, are operated, respectively, by solenoids 199 and 188 and are provided, respectively, with interlocks or switches 197, 198, 202 and 190, 191, 192 and 193, which serve to control various functions of the machine in a manner which will later become more apparent in connection with the description of the operation of the machine in its entirety.

Operation

The description of the cycle of operation of the machine will now be set forth with respect to the conditions existing when the machine is tooled up, as illustrated in Fig. 10, Sheet 9, and Fig. 11, Sheet 10, since this set-up requires all of the various functions of the bars 27, 28 and 108 to be performed.

The description of the operative cycle will start with the assumption that the machine has been stopped with the tool carrier or holder 25 in its extreme right-hand position, the bar 28 oscillated or rocked clockwise until the cam 29 is so positioned that the tool holder has rocked or oscillated by gravity counterclockwise to move the tools 26 clear of the workpiece 24 and the tool holder 125 has been rocked clockwise by the spring 107 to its extreme position to move the tool 126 clear of the work 24. It will also be assumed that the hand operated switch 162, see Fig. 17, is open and all current is cut off from the machine, at which time all of the motor switches and relays will be in their open or inoperative positions.

The operator will first close the hand control switch 162 to cause current to flow through the main line wires 159, 160 and 161 and start the operation of the pump motor 152. The pump 151 will thereupon start its operation and lubricating oil circulating through the delivery pipe 155 closes the pressure operated switch 158, whereupon current can pass from the line wire 159, through the control line 179, switch 158 to control line 180 and thence to the various switches. The operator then closes the hand operated starting switch 169 on the hand controlled panel 167 to close the circuit from line 180, through line 181 to the motor starter solenoid 182 and back to the main line wire 160, thereby energizing starter solenoid 182 and closing the motor starting switch 183 to start the motor 17 in operation. The holding interlock 184 is automatically closed by the closing of the switch 183 so that current flows from the line 180 through the closed stop switch 170, the closed jog switch 171, the closed stop switch 119, the holding interlock 184 to solenoid 182 and thence to the main line wire 160, thereby maintaining energization of the solenoid 182 and holding switch 183 closed upon the release of switch 169 by the operator. If the operator should desire to stop the motor 17 he opens the stop switch 170 on the hand control panel 167 and breaks the control circuit which has been described, whereupon the solenoid 182 is deenergized and the switch 183 is opened.

In case the operator for any reason wishes to momentarily jog the motor 17 he may do so by means of the jog switch 171 on the hand control panel 167 and the operation of said switch 171 serves first to break the described holding circuit to solenoid 182 and then acts to close a circuit from line 185 through the line 181 to the motor starter solenoid 182, whereupon the switch 183 is closed and the motor 17 is operated. The circuit just referred to is maintained closed for only as long as the operator desires to effect a closed circuit through lines 181 and 185 by means of the switch 171, inasmuch as the switches 169, 170 and 171 are spring actuated and normally return to their original positions.

The operator having started the motor 17 can now insert a piece of work 24 between the spindle 14 and tailstock 15 and by causing operation of the hydraulic cylinder 21 bring about the gripping of the workpiece by the spindle, as will be well understood and which need not be described herein.

When the workpiece 24 has been loaded in the machine, as just referred to, the operator by means of the hand lever 50 on the top of the headstock 11 shifts the sleeve or yoke 49 to clutch the pulley 16 to the shaft 41 to cause the spindle 14 to be driven by the motor 17.

If the operator desires to start the tool movement slowly and synchronously with the rotation of the work spindle 14, he may move the hand lever 178 to the position marked "Slow" on the hand control panel 167, with the result that the cam 175 is shifted to the left and the switch 172 closed. When the switch 172 is closed current will flow from the control line 180, through the line 185, switch 90, switch 175, line 186, closed switch 174, switch 172, which has just been closed, line 187 to solenoid 188 of the relay 166, and thence back to the main line wire 160 through the line 189 and which results in energizing the solenoid 188 and closing the interlocks 190, 191, 192 and 193 of the relay 166. The closing of the interlock 190 effects a holding circuit to the solenoid 188 through the closed switch 174, line 194, closed switch 122 and line 195. The closing of the interlock 191 allows current to flow from the main line wire 159 through the line 196, the closed interlock 191, the closed interlock 197 of the relay 165, thence through the brake solenoid 78 and back to the main line wire 160, it being understood that the brake solenoid 78 is thus energized. The closing of the interlock 192 produces no effect, since the circuit is still broken by the open interlock 198 of the relay 165, while the closing of the interlock 193 likewise has no effect as the circuit through the solenoid 199 of the relay 165 is kept open by the switches 120 and 173.

The energization of the solenoid 78, as just referred to, applies the brake shoes 74 and 75 to the drum 73 that is keyed to the sleeve 66, wherefore the differential gear 67 is held against movement. Inasmuch as the spindle 14 is rotating, the worm gear 64 is driven from the spindle 14 through the worm 63 and the sprockets, chains and gearing hereinbefore described, but since the differential gear 67 is held stationary, the worm gear 64 will drive the gear 72 and shaft 68 through the differential. The driving of the shaft 68 will act through the worm 91 and worm gear 92 to drive the cam shaft 30 and its attached cams at a slow speed and synchronously with the rotation of the spindle 14, see Fig. 2.

Ordinarily the operator will not employ the slow feed on the start of the machine, but will continue the rocking movement of the hand lever 178 until it reaches the "Fast" position indicated on the hand control panel 167. The movement of the hand lever 178 to this "Fast" position moves the cam 175 to the left, as viewed in Fig. 17, until the switch 173 is closed, whereupon current flows from the line 194, through the closed switch 173, line 200 to solenoid 199 and thence through line 201, the closed interlock 193 and line 189 to the main line wire 160, with the result that an energizing circuit is completed through the solenoid 199 of the relay 165 with a resultant closing of the interlocks 202 and 198 and an opening of the interlock 197. The closing of interlock 202 effects a holding circuit through the solenoid 199 from the line 186 and through closed switch 174, line 194, closed switches 122 and 121, the closed interlock 202, line 201, closed interlock 193 and line 189. The opening of the interlock 197 interrupts the current through the brake solenoid 78 and releases the brake shoes 74 and 75 and renders the differential gear 67 free to rotate. Upon the closing of the interlock 198 a circuit is completed from the line 186, through the closed interlocks 192 and 198, the solenoid 203 to the line 189, and thence back to the main line wire 160, with the result that the solenoid 203 is energized and the forward switch 204 for the motor 31 is closed and the operation of said motor in the forward direction started. The shaft 68 will now be driven by the motor 31 at a relatively high constant speed, and consequently the cam shaft 30 and its attached cams will be similarly driven through the pulleys 83 and 85 and the belt 84, it being understood that the differential gear 67 is now driven idly by the gear 72 through the pinions 69 and 70 of the differential.

Referring to Figs. 2 and 6 of the drawings, it will be seen that the rotation of the cam shaft 30, as just referred to, causes the cam 102 to move the arm 105 against the tension of spring 107 and acts to rock the shaft 108 to effect rapid movement of the tool holder 125 in a direction to cause the tools 126 to rapidly approach the workpiece 24. The rotation of the cam shaft 30 at the high constant speed also causes the cam 93 to move the bar 27 longitudinally toward the left, as viewed in Fig. 6 or 10, while the cam 109 fixed to cam shaft 30, see Figs. 1 and 3, rocks the arm 111 of the link 112 to rock bar 28 in a counterclockwise direction, so that the cam 29, carried by the bar 28, will rock the tool holder 25 in a clockwise direction to cause the tools 26 to approach the workpiece 24. It will be understood that the idle movements just referred to take place at a rapid rate, since the cam shaft 30 is being driven by the motor 31 at a high constant speed.

One of the adjustable fingers 117 is so located on the cam shaft 30 that as the tools 26 and 126 reach feeding or cutting position the said finger will operate the switch 121, see Figs. 1 and 17, to open the same and break the holding circuit through the solenoid 199 of the relay 165. This deenergization of the solenoid 199 causes the interlock 202 to open and to maintain the holding circuit open. The deenergization of the solenoid 199 also causes the interlock 198 to open and break the circuit through the solenoid 203 of the motor starter 164, thus opening the switch 204 and stopping the operation of the motor 31. The deenergization of the solenoid 199 also causes the interlock 197 to close and complete a circuit through the brake solenoid 78 to apply the brake shoes 74 and 75 to the brake drum 73, whereupon the drive to the cam shaft 30 and the cams attached thereto or operatively associated therewith will now be from the spindle 14, through the differential previously described. At this time the armature of the motor 31 will be rotated idly through the pulleys 83 and 85 and belt 84.

Also at this time the cam roller 110 of the arm 111 of the link 112 has reached the land of the cam 109, see Fig. 3, with the result that no further rocking movement is imparted to the bar 28. However, the continued rotation of the cams 93 and 102 serves to move the tool holders 25 and 125, respectively, to cause the tools 26 to feed longitudinally of the spindle and the work piece, while the tools 126 feed transversely of the work piece and the spindle axis.

It will also be understood that the cams 93 and 102 are so designed that the cam rollers 95 and 103, respectively, reach lands on the cams concurrently with the tools reaching the end of their feeding movements, while at this time another of the adjustable fingers 117 will act on the switch 120 to close said switch and energize the solenoid 199 from the line 186 and through the closed switch 174 and the line 194. The energization of the solenoid 199 makes a holding circuit for the solenoid 199 by closing the interlock 202, but breaks the circuit through the brake solenoid 78 by opening the interlock 197, whereupon the brake shoes 74 and 75 are released. The energization of the solenoid 199 also closes the circuit through the solenoid 203 of the motor starter 164 since the interlock 198 is now closed. The energization of the solenoid 203 starts the motor 31 in operation to cause the cam shaft 30 to be driven thereby at a high constant speed.

The cams are so designed and synchronized that the cam 109 first allows the bar 28 to be rocked in a clockwise direction by the spring 208 to permit the tool holder 25 to rock in a counterclockwise direction and move the tools 26 clear of the workpiece, whereupon the cam 93 shifts the bar 27 longitudinally to the right to return the tool holder 25 to its original starting position, during which time the cam 102 revolves to a position such that the spring 107 can function to rock the shaft 108 and return the tool holder 125 to its original starting position. It will be seen that the return movements of the tool holders take place at the high constant speed, since the cam shaft 30 is then driven by the motor 31.

Concurrently with the tools and tool holders returning to their original starting positions another of the adjustable fingers 117 is brought by the movement of the cam shaft 30, into contact with the switch 122 to open said switch and break the holding circuit through both the solenoids 188 and 199, whereupon the relays 165 and 166 drop out and all circuits therethrough are opened and the operation of the motor 31 stopped and the brake solenoid 78 is deenergized, at which time the operation of the cam shaft 30 ceases, together with all movements of the cams carried thereby or associated therewith, as well as all movements of the tool slides or holders. The operator may then stop the spindle 14 by shifting the clutch lever 50 to disengage the pulley 16 from the shaft 41 and to brake said shaft, whereupon the workpiece 24 can be unloaded from the machine, a new workpiece inserted and the cycle of operation repeated.

Should the operator desire to automatically stop or start the motor 17 at any predetermined time during the automatic functioning of the machine the fingers 117 which cooperate with the switches 118 and 119 may be adjusted so as either to open the switch 119 and stop the motor 17 by breaking the holding circuit to the motor starter solenoid 182, or to close the starting switch 118 and start the motor 17 by energizing the motor starter solenoid 182.

If during the setting up of the machine it is desired to run the cam shaft 30 at a high speed in the reverse direction, the reverse jog switch 175a of the hand control panel 167 may be manually operated for such purpose.

The operation of the reverse jog switch 175a first causes all of the control current for the operation of the cam shaft 30 to be cut off, since said current comes from the main line wire 159 through the line 179, switch 158, lines 180, 185, switch 90 and switch 175a, wherefore the brake solenoid 78 will not be energized and the motor 31 will not be operated in a forward direction during the first part of the operation of the jog switch 175a. The continued operation of the jog switch 175a, however, closes the contacts 205, whereupon current will flow from the control line to the reverse solenoid 206 of the motor starter 164 and thence through line 189 back to the main line wire 160. The solenoid 206 is thereby energized and effects the closing of the reversing switch 207 to cause the motor 31 to operate in the reverse direction.

It will be noted that no holding circuit is provided when the motor is operating in the reverse direction, and consequently the motor 31 will continue to operate in the reverse direction only so long as the operator causes the reverse jog switch 175a to close the contacts 205.

If the circulation of lubricant should fail at any time during the cycle of operation of the machine no damage would be done, since as soon as the lubricating pressure becomes reduced to a predetermined point the switch 158 will automatically open and hence all control current for the motor 17, the motor 31 and the brake solenoid 78 will be interrupted, with the result that the operation of the machine will completely stop.

It should also be noted that should the control circuit become broken for any reason, or should the current be cut off from the machine, all functions and operations of the machine will immediately stop, but that upon resumption of the current the operation or functioning of the machine will not recur except at the will of the operator.

From the foregoing it will be seen that the machine illustrated and described herein adequately obtains the objects and advantages previously referred to and fully possesses the safety features requisite in a machine of this character.

Although certain embodiments of the invention, together with various forms of tooling which may be followed have been illustrated, it should be understood that the invention is susceptible of various changes, modifications and adaptations coming within the scope of the appended claims.

Having thus described my invention, I claim:

1. In a machine tool of the character specified, movable work holding means, tool holding means, means for imparting idle or feeding movements to said tool holding means and including a slidable member supporting said tool holding means, a rockable member for oscillating said tool holding means, and means for operating said members either synchronously with the movement of said work holding means during the feeding movements or independently of the movement thereof during the idle movements and including a feed shaft, operative connections between said shaft and said work holding means, and means for driving said feed shaft independently of said work holding means.

2. In a machine tool of the character specified, movable work holding means, tool holding means, means for imparting idle or feeding movements to said tool holding means and including slidable and rockable members, and means for operating said members either synchronously with the movement of said work holding means during feeding movements or independently of the movement thereof during idle movements, said last named means including a feed shaft, operative connections between said shaft and said work holding means including a differential, a brake for holding one element of said differential stationary, and means for driving said feed shaft independently of said work holding means when said brake is inactive.

3. In a machine tool of the character specified, movable work holding means, tool holding means, means for imparting idle or feeding movements to said tool holding means and including slidable and rockable members, and means for operating said members either synchronously with the movement of said work holding means during feeding movements or independently of the movement thereof during idle movements, said last named means including a feed shaft, operative connections between said shaft and said work holding means including a differential, a brake for holding one element of said differential stationary, a solenoid controlling said brake, an electric motor for driving said feed shaft independently of said work holding means when said brake is inactive, and electric control means for said solenoid and motor and including switches and interlocks such that when said brake is active said motor is then always inactive.

4. In a machine tool of the character specified, a movable work holding means, movable tool holding means, a common power source, operative connections between said source and both of said means for producing synchronous relative movements between said means, and means for moving said tool holding means independently of the movement of the work holding means and including an electric motor, a brake operatively associated with said power source, a solenoid controlling said brake, switches controlling said solenoid and motor, and electrical interlocks between said switches such that when said brake is active said motor must be inactive.

5. In a machine tool of the character specified, a movable work holding means, movable tool holding means, an electric motor, operative connections between said motor and both of said means for producing synchronous relative movements between said means, means for effecting movement of said tool holding means independently of the movement of the work holding means and including an electric motor, a brake, and a solenoid controlling said brake; an electrical control circuit for said motors and solenoid and including switches; means for conducting lubricant to the work holding means and tool holding means and for circulating the lubricant therethrough under pressure; and means arranged in said control circuit and controlled by the pressure of the circulating lubricant for making or breaking said circuit to said solenoid and motors.

6. In a machine tool of the character specified, a movable work holding means, movable tool holding means, a common electric motor and operative connections between the same and both of said means for moving both of said means synchronously, a second electric motor for moving only said tool holding means, means for selectively effecting the synchronous movement of both of said means or the independent movement of the tool holding means and comprising an electrical control system including a solenoid and switches; manual means for producing relative movements between said holding means; and means also included in said control system and functioning automatically during operation of said manual means to render one of said motors inactive.

7. In a machine tool of the character specified, a movable work holding means, movable tool holding means, means for producing relative movements between said work holding means and said tool holding means and including electric motors and a feed shaft; an electrical control system for controlling the operation of said motors and including a control circuit and a plurality of switches, certain of which are operated in timed relation to the operation of said feed shaft, and means included in said control system and functioning upon any break occurring in said control circuit to render said motors inactive whereby no motion will be imparted to said feed shaft.

8. In a machine tool of the character specified, a bed, upright housings at opposite ends of the bed, a work spindle rotatably mounted in one of said housings, a cam shaft rotatably supported by both of said housings and extending therebetween, means in the housing that mounts said work spindle for rotating said cam shaft synchronously with the rotation of said work spindle or independently thereof and including a feed shaft, operative connections between said shaft and said work holding means, and means for driving said feed shaft independently of said work holding means, a slidable and rockable bar supported by said housings and extending therebetween, tool holding means mounted on said bar, a rockable bar supported by said housings and extending therebetween parallel to said slidable and rockable bar, a cam carried by said rockable bar and directly operatively associated with said tool holding means, and means carried by said cam shaft for synchronously sliding said slidable and rockable bar and for rocking said rockable bar.

9. In a machine tool of the character specified, a movable work holding means, movable tool holding means, a common electric motor and operative connections between the latter and both of said means for moving both of said means synchronously, a second electric motor for moving only said tool holding means, means for selectively effecting the synchronous movement of both of said means or the independent movement of the tool holding means and comprising a brake and an electrical control system including switches and a solenoid for actuating said brake; manual means for producing relative movements between said holding means; and means also included in said control system and functioning automatically during operation of said manual means to render one of said motors and said solenoid inactive.

10. In a machine tool of the character specified, a movable work holding means, movable tool holding means, means for producing relative movements between said work holding means and said tool holding means and including electric motors, a feed shaft and a brake; an electrical control system for controlling the operation of said motors and including a control circuit, a solenoid for actuating said brake, and a plurality of switches certain of which are operated in timed relation to the operation of said feed shaft, and means included in said control system and functioning when any break occurs in said control circuit to render said solenoid and said motors inactive whereby no motion will be imparted to said feed shaft.

MYRON S. CURTIS.